No. 798,566. PATENTED AUG. 29, 1905.
C. CARROLL.
DUMPING WAGON.
APPLICATION FILED SEPT. 23, 1904.
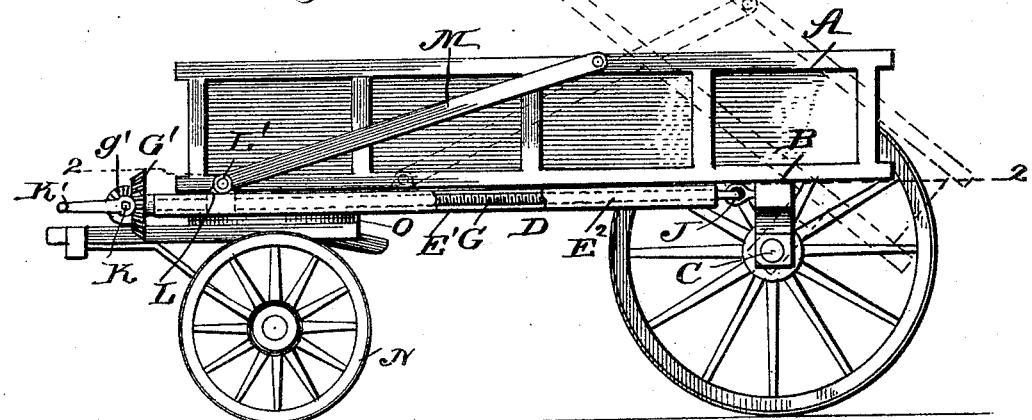
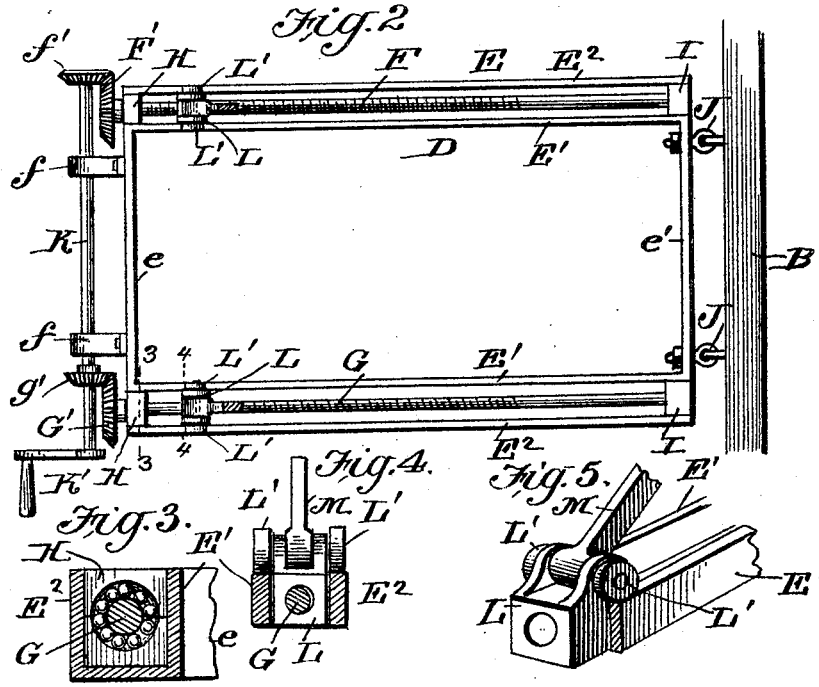
WITNESSES:
Jos. A. Ryan
Percy B. Turpin
INVENTOR
Charles Carroll.
BY Munn & Co.
ATTORNEYS

UNITED STATES PATENT OFFICE.

CHARLES CARROLL, OF CHICAGO, ILLINOIS.

DUMPING-WAGON.

No. 798,566. Specification of Letters Patent. Patented Aug. 29, 1905.

Application filed September 23, 1904. Serial No. 225,579.

*To all whom it may concern:*

Be it known that I, CHARLES CARROLL, a citizen of the United States, and a resident of Chicago, in the county of Cook and State of Illinois, have made certain new and useful Improvements in Dumping-Wagons, of which the following is a specification.

My invention is an improvement in dumping-wagons, and has for an object, among others, to provide a novel construction for supporting the screws and the traveling nuts for operating the lifting-rods connected with the body; and the invention consists in certain novel constructions and combinations of parts, as will be hereinafter described and claimed.

In the drawings, Figure 1 is a side elevation, parts being broken away, of a wagon embodying my invention. Fig. 2 is a plan view on about line 2 2 of Fig. 1, illustrating the bed-frame and the connection thereof with the rear axle. Fig. 3 is a detail cross-section on about line 3 3 of Fig. 2. Fig. 4 is a cross-section on about line 4 4 of Fig. 2, and Fig. 5 is a detail perspective view of one of the traveling nuts in connection with its supporting-rails and the lifting-bar connected with said nut.

By my invention I secure the body A near its rear end to the bolster B, mounted on the rear axle C, so the body A will turn to and from dumping position concentrically with the axle. I also employ a bed-frame D, including the opposite side sections E, having inner and outer rails E' and E², spaced apart sufficiently to receive between them the screws F and G. These side sections E are connected by the front bar $e$ and the rear bar $e'$, while the rails E' and E² are connected at their front and rear ends by the bearing-bars H and I, which may be supplied with ball-bearings in any suitable manner—such, for instance, as illustrated in Fig. 3—in which bearings the screws F and G journal, so they may be turned by the means presently described. The bed-frame D is connected with the bolster B so the latter may turn, and such connection may preferably be effected by means of the eyebolts J, connected with the bed-frame and with the bolster and looped together, as will be understood from Figs. 1 and 2 of the drawings.

Means are provided for turning the screws F and G in unison. This may preferably be effected by the construction shown, in which bevel-gears F' and G' are secured on the front ends of the screws F and G and mesh with bevel-gears $f'$ and $g'$ on the drive-shaft K, which is mounted in bearings $f$ at the front end of the bed-frame and has a crank-handle or other means K' by which it may be turned. The screws F and G are threaded in the nuts L, which slide between the rails E' and E² and are supported upon said rails as they travel back and forth in such manner as to relieve the screws of the weight of the body A and the load in lifting the latter. In supporting the nuts L upon the rails it is preferred to provide said nuts with rollers L', running upon the rails, as shown in Figs. 1, 2, 4, and 5. These nuts L are connected by the lifting-rods M with the body, so that as the nuts are caused to travel to the rear by properly turning the shaft K, the body will be lifted from the position shown in full lines, Fig. 1, to that indicated in dotted lines in said figure to dump the load, while a reverse movement of the shaft K will cause the nuts to move to the front and lower the body to the position shown in full lines, Fig. 1, ready to receive another load.

The construction is simple, strong, easily operated, avoids exerting the weight of the load upon the screws in such manner as to bend the same downwardly, and will be found effectual in use for the purposes described.

The bed-frame may be connected at its front end with the front wheels N by any suitable fifth-wheel construction, such as shown at O in Fig. 1, or by any of the other well-known forms of connection used in wagon construction.

The screws may be both alike, as shown, or may, if desired, be made one right and the other a left hand screw, in which case the gearing would be changed to secure the proper operation of the parts.

Having thus described my invention, what I claim as new, and desire to secure by Letters Patent, is—

1. The improvement in dumping-wagons herein described consisting of the body, the rear axle and its bolster to which said body is connected, the bed-frame jointed at its rear end to the rear bolster and comprising the side sections having inner and outer rails and the bearing-bars connecting said rails and having bearings for the screws, and the front and rear bars connecting the opposite side sections, the screws extending between the inner and outer rails of their respective sections and journaled in the bearing-bars connecting said rails, means for turning said screws in unison, the nuts fitting on said screws between the side rails of the sections and provided with rollers running upon said rails, and the lifting-bars connecting said nuts with the body substantially as set forth.

2. The combination in a dumping-wagon of the body, the rear axle, means whereby the body is secured near its rear end to the axle, the bed-frame jointed at its rear end to the axle and provided with the opposite side sections having rails spaced apart, screws extending between the spaced-apart rails of the side sections, the nuts on said screws and guided between the spaced-apart rails of the side sections, rollers connected with said nuts and running upon the upper edges of the rails of the side sections, and lifting-bars connecting the nuts with the body, substantially as set forth.

3. The combination in a dumping-wagon with the body of the bed-frame having opposite side sections provided with rails, screws extending between the rails of their respective side sections, nuts operating on the screws and having supporting devices movable along the upper edges of the rails of the side sections, and connections between the nuts and the wagon-body substantially as set forth.

4. The combination in a dumping-wagon with the body, of frame-sections arranged at the opposite sides of said body and having inner and outer rails, screws arranged at the opposite sides of the body and extending between the inner and outer rails, nuts operating on said screws between the rails of the sections above the screws supported on said rails, and the lifting-rods connecting said nuts with the body and the rear axle secured to the body near its rear end substantially as set forth.

5. In a dumping-wagon a bed-frame provided with side sections having rails spaced apart and screws extending between said rails, nuts operating on the screws and fitted between the rails, and guided by the body, and connections between the nuts and the body substantially as set forth.

CHARLES CARROLL.

Witnesses:
 EDWARD H. TAYLOR,
 ELVER N. NELSON.